(12) United States Patent
Shvartz et al.

(10) Patent No.: US 11,277,580 B2
(45) Date of Patent: Mar. 15, 2022

(54) I, Q COUNTER CIRCUIT AND METHOD FOR TIME-OF-FLIGHT IMAGE SENSOR

(71) Applicant: Sony Semiconductor Solutions Corporation, Kanagawa (JP)

(72) Inventors: Itai Shvartz, Petach-Tikva (IL); Elad Ilan, Western Galilee (IL)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/836,224

(22) Filed: Mar. 31, 2020

(65) Prior Publication Data

US 2021/0235035 A1 Jul. 29, 2021

Related U.S. Application Data

(60) Provisional application No. 62/965,224, filed on Jan. 24, 2020.

(51) Int. Cl.
*H04N 5/33* (2006.01)
*H04N 5/378* (2011.01)
*H04N 5/341* (2011.01)

(52) U.S. Cl.
CPC ............... *H04N 5/378* (2013.01); *H04N 5/33* (2013.01); *H04N 5/341* (2013.01)

(58) Field of Classification Search
CPC ........ H04N 5/378; H04N 5/359; H04N 5/374; H04N 5/335; H04N 5/355; H04N 5/35554; H04N 5/3559; H04N 5/37455; H04N 5/379; H04N 1/00244; H04N 1/00326; H04N 1/00358; H04N 1/00376; H04N 1/00968; H04N 1/107; H04N 1/32133; H04N 1/32778
USPC ......................................................... 348/164
See application file for complete search history.

(56) References Cited

U.S. PATENT DOCUMENTS

| | | | |
|---|---|---|---|
| 2004/0190092 A1* | 9/2004 | Silverbrook ....... | H04N 1/00376 358/539 |
| 2009/0033759 A1* | 2/2009 | Wakabayashi ......... | H04N 5/335 348/222.1 |
| 2018/0376090 A1* | 12/2018 | Liu ........................ | H04N 5/378 |

* cited by examiner

*Primary Examiner* — Masum Billah
(74) *Attorney, Agent, or Firm* — Michael Best & Friedrich LLP (57) ABSTRACT

A time-of-flight device comprises a pixel array including a plurality of pixel circuits arranged in an array, respective ones of the plurality of pixel circuits including a first photodiode configured to selectively output two analog signals respectively via two paths, and including a second photodiode configured to selectively output two analog signals respectively via two paths; a signal line coupled to the first photodiode and a second photodiode; and processing circuitry including: a comparator configured to compare a voltage of the signal line with a reference signal and to output a comparison result, and a counter configured to perform a count based on the comparison result in response to a count control signal, wherein the count control signal is configured to switch the counter between an up count mode and a down count mode while a count value is held in the counter.

18 Claims, 6 Drawing Sheets

I, Q COUNTER CIRCUIT AND METHOD FOR TIME-OF-FLIGHT IMAGE SENSOR

BACKGROUND OF THE INVENTION

1. Field of the Invention

This application relates generally image sensors. More specifically, this application relates to a system and method for distance and depth determination in a time-of-flight (TOF) image sensor.

2. Description of Related Art

Image sensing devices typically include an image sensor, generally implemented as an array of pixel circuits, as well as signal processing circuitry and any associated control or timing circuitry. Within the image sensor itself, charge is collected in a photoelectric conversion device of the pixel circuit as a result of the impingement of light. There are typically a very large number of individual photoelectric conversion devices (e.g. tens of millions), and many signal processing circuitry components working in parallel. Various components within the signal processing circuitry are shared by a large number of photoelectric conversion devices; for example, a column or multiple columns of photoelectric conversion devices may share a single analog-to-digital converter (ADC) or sample-and-hold (S/H) circuit.

BRIEF SUMMARY OF THE INVENTION

Various aspects of the present disclosure relate to an image sensor and distance determination method therein.

According to one aspect of the present disclosure, there is provided a time-of-flight sensor, comprising: a pixel array including a plurality of pixel circuits arranged in an array, respective ones of the plurality of pixel circuits including a first photodiode configured to selectively output a first analog signal via a first path and a second analog signal via a second path, and including a second photodiode configured to selectively output a third analog signal via a third path and a fourth analog signal via a fourth path; a signal line coupled to the first photodiode and a second photodiode; and processing circuitry including: a first comparator configured to compare a voltage of the signal line with a reference signal and to output a comparison result, and a counter configured to perform a count based on the comparison result in response to a count control signal, wherein the count control signal is configured to switch the counter between an up count mode and a down count mode while a count value is held in the counter.

According to another aspect of the present disclosure, there is provided a time-of-flight system, comprising: a light source configured to emit a light; and a sensor comprising: a pixel array including a plurality of pixel circuits arranged in an array, respective ones of the plurality of pixel circuits including a first photodiode configured to selectively output a first analog signal via a first path and a second analog signal via a second path, and including a second photodiode configured to selectively output a third analog signal via a third path and a fourth analog signal via a fourth path, a signal line coupled to the first photodiode and a second photodiode, and processing circuitry including: a comparator configured to compare a voltage of the signal line with a reference signal and to output a comparison result, and a counter configured to perform a count based on the comparison result in response to a count control signal, wherein the count control signal is configured to switch the counter between an up count mode and a down count mode while a count value is held in the counter.

According to another aspect of the present disclosure, there is provided a system, comprising: a first sensor configured to generate an image data, the first sensor comprising a first pixel array; and a second sensor configured to generate a distance data, the second sensor comprising: a second pixel array including a plurality of pixel circuits arranged in an array, respective ones of the plurality of pixel circuits including a first photodiode configured to selectively output a first analog signal via a first path and a second analog signal via a second path, and including a second photodiode configured to selectively output a third analog signal via a third path and a fourth analog signal via a fourth path, a signal line coupled to the first photodiode and a second photodiode, and processing circuitry including: a comparator configured to compare a voltage of the signal line with a reference signal and to output a comparison result, and a counter configured to perform a count based on the comparison result in response to a count control signal, wherein the count control signal is configured to switch the counter between an up count mode and a down count mode while a count value is held in the counter.

As such, various aspects of the present disclosure provide for improvements in at least the technical field of depth sensing, as well as the related technical fields of imaging, image processing, and the like.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

Moreover, while the present disclosure focuses mainly on examples in which the processing circuits are used in image sensors, it will be understood that this is merely one example of an implementation. It will further be understood that the disclosed systems and methods can be used in any device in which there is a need to detect distance in a wave-based sensor; for example, an audio circuit, phononic sensor, a radar system, and the like.

Imaging System

Figure 1A:
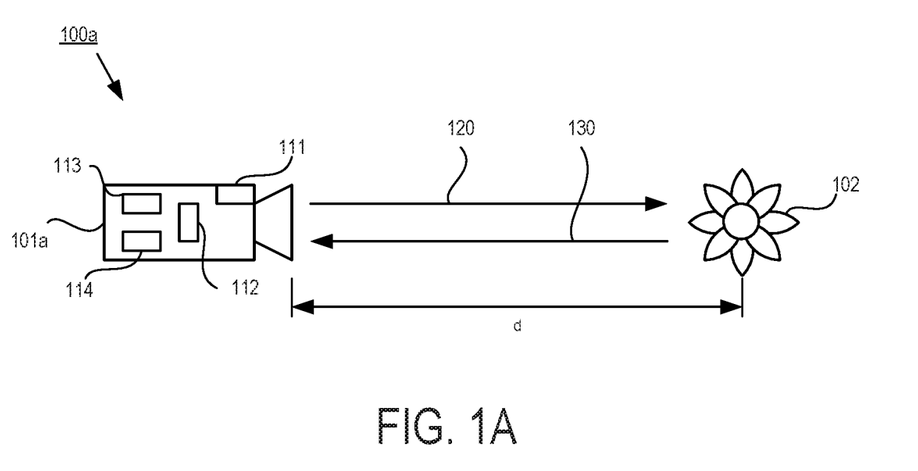
FIGS. 1A and 1B illustrate exemplary TOF systems according to various aspects of the present disclosure.

FIG. 1A illustrates a first example 100a of a TOF imaging system 101a configured to detect and/or an object 102 located a distance d away. The TOF imaging system 101a includes a light generator 111 configured to generate an emitted light wave 120 toward the object 102 and a TOF image sensor 112 configured to receive a reflected light wave 130 from the object 102. The emitted light wave 120 may have a periodic waveform. The TOF image sensor 112 may be any device capable of converting incident radiation into signals. For example, the TOF image sensor 112 may be implemented by a Complementary Metal-Oxide Semiconductor (CMOS) Image Sensor (CIS), a Charge-Coupled Device (CCD), and the like. The TOF imaging system 101a may further include distance determination circuitry such as a controller 113 (e.g., a CPU) and a memory 114, which may operate to perform one or more examples of time-of-flight processing as described further below.

Figure 1B:
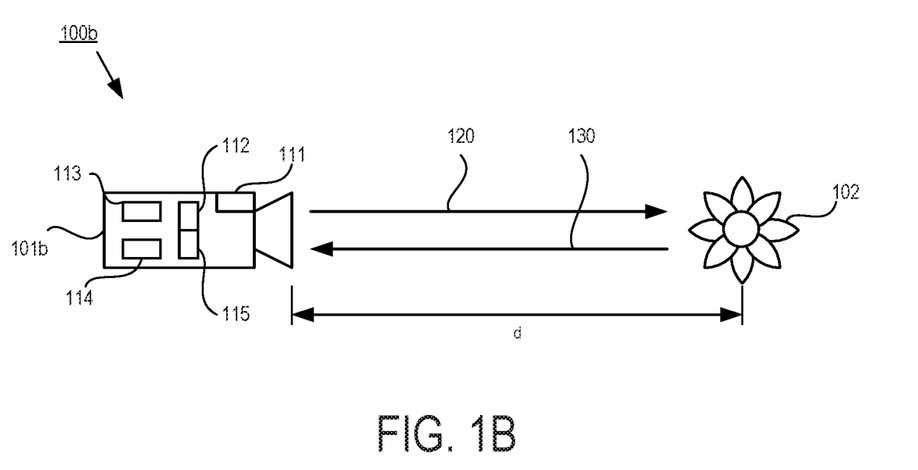

FIG. 1B illustrates a second example 100b of a TOF imaging system 101b configured to detect and/or image an object 102 located a distance d away. The TOF imaging system 101b includes a light generator 111 configured to generate an emitted light wave 120 toward the object 102, a TOF image sensor 112 configured to receive a reflected light wave 130 from the object 102, and an RGB image sensor 115 configured to capture an RGB image of the object 102. The emitted light wave 120 may have a periodic waveform. The TOF image sensor 112 may be any device capable of converting incident radiation into signals. For example, the TOF image sensor 112 and the RGB sensor 115 may each be implemented by a CIS, a CCD, and the like. While the second example 100b is described with reference to an RGB image sensor 115, in practice the image sensor 115 may capture a monochromatic image or may include color filters different from RGB. Furthermore, while FIG. 1B illustrates the TOF image sensor 112 and the RGB image sensor 115 as separate components, in some aspects of the present disclosure the TOF image sensor 112 and the RGB image sensor 115 may be integrated as a single chip and/or utilize a single pixel array. The TOF imaging system 101b may further include distance determination and processing circuitry such as a controller 113 (e.g., a CPU) and a memory 114, which may operate to perform one or more examples of time-of-flight and image processing as described further below.

The light generator 111 may be, for example, a light emitting diode (LED), a laser diode, or any other light generating device or combination of devices, and the light waveform may be controlled by the controller 113. The light generator may operate in the infrared range so as to reduce interference from the visible spectrum of light, although any wavelength range perceivable by the image sensor 112 may be utilized. The controller 113 may be configured to receive an image from the image sensor and calculate a depth map indicative of the distance d to various points of the object 102.

Figure 2:
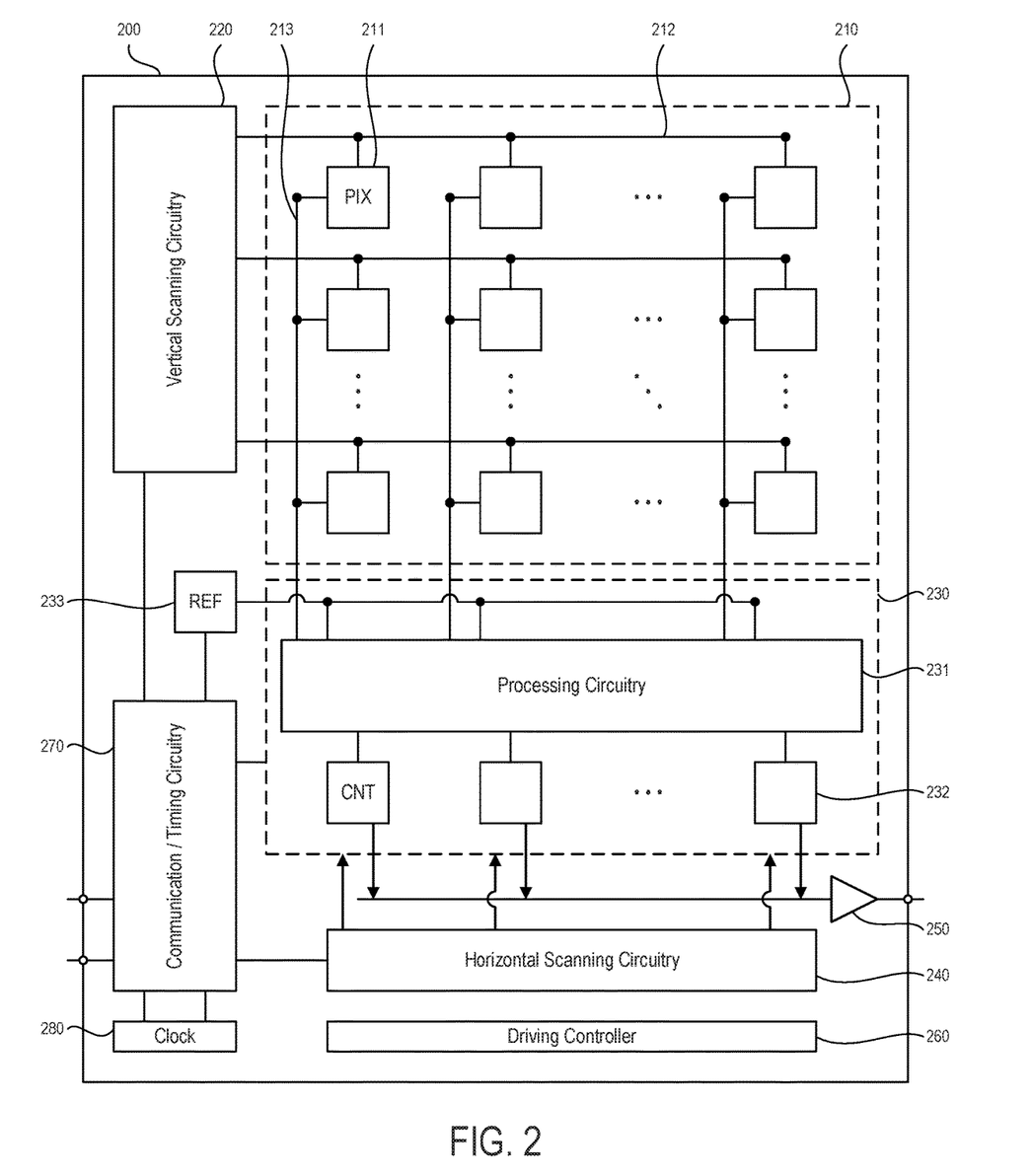
FIG. 2 illustrates an exemplary TOF sensor according to various aspects of the present disclosure.

FIG. 2 illustrates an exemplary image sensor 200 according to various aspects of the present disclosure. The image sensor 200 may be an example of the image sensor 112 illustrated in FIGS. 1A-B. As illustrated in FIG. 2, the image sensor 200 includes an array 210 of pixel circuits 211, each of which are located at an intersection where a horizontal signal line 212 and a vertical signal line 213 cross each other. The horizontal signal lines 212 are operatively connected to vertical scanning circuitry 220, also referred to as a "row scanning circuit" or a "vertical driving circuit," at a point outside of the pixel array 210. The horizontal signal lines 212 carry signals from the vertical scanning circuitry 220 to a particular row of the pixel circuits 211. While FIG. 2 illustrates a single horizontal signal line 212 for a given row of the pixel circuits 211, in practice a plurality of the horizontal signal lines 212 may be provided for each row of the pixel circuits 211.

Figure 3:
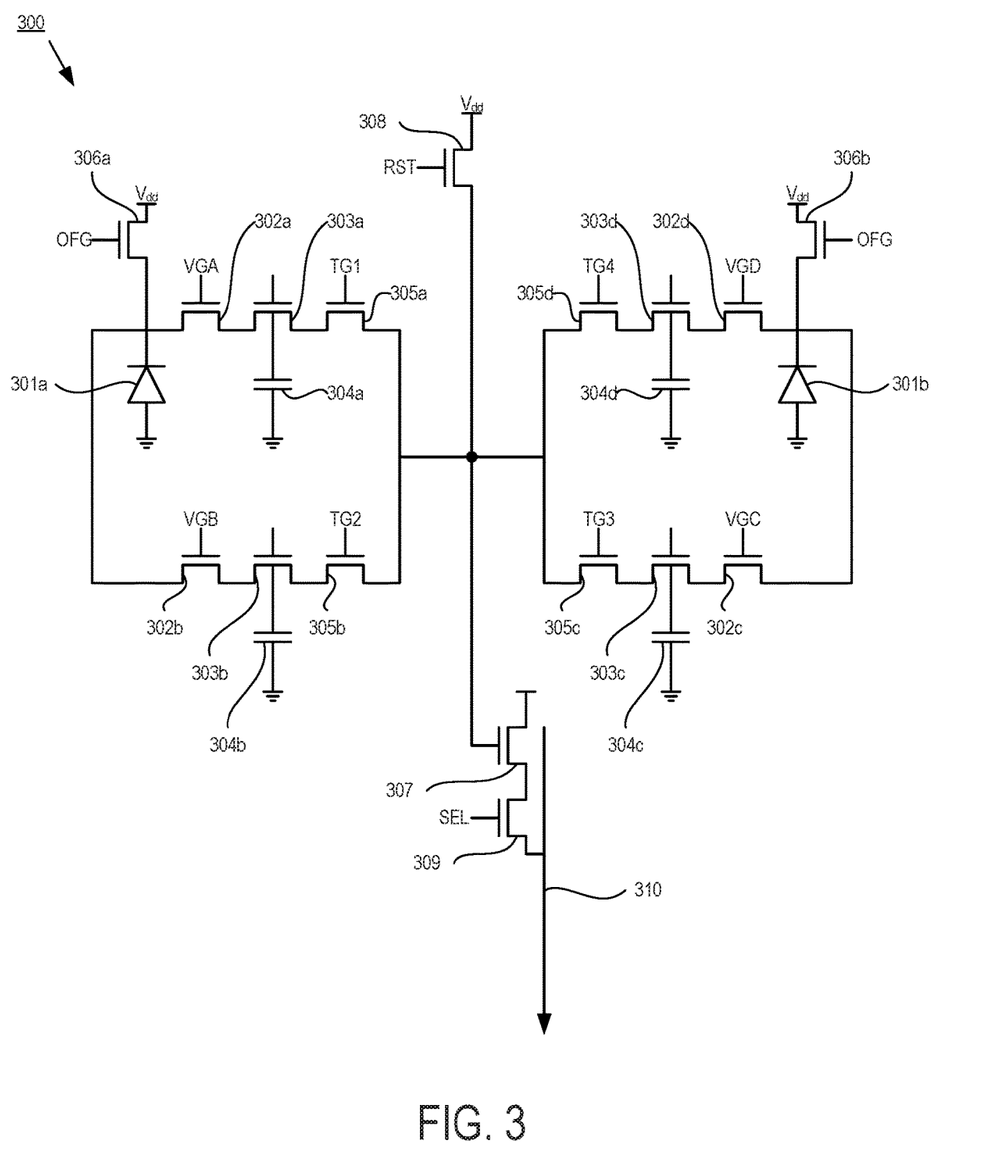
FIG. 3 illustrates an exemplary pixel circuit according to various aspects of the present disclosure.

The pixel circuits 211 store a charge corresponding to an amount of incident light alternately in floating diffusions, capacitors, or other storage elements (for example, as illustrated in FIG. 3) and selectively output an analog signal corresponding to an amount of the charge to the vertical signal line 213 in a manner that will be described in more detail below. While FIG. 2 illustrates a single vertical signal line 213 for a given column of the pixel circuits 211, in practice a plurality of vertical signal lines 213 may be provided for a given column of the pixel circuits 211, such that the pixel circuits 211 different rows are connected to different vertical signal lines. In such a configuration, the plurality of vertical signal lines 213 may be disposed on a single side or on both sides of the given pixel circuit 211. Furthermore, for illustration purposes, only a subset of the pixel circuits 211 in the array 210 are actually shown in FIG. 2; however, in practice the image sensor 200 may have any number of the pixel circuits 211. The present disclosure may also be implemented with two vertical signal lines 213 for each column of the pixel circuits 211 such that each pixel circuit 211 outputs signals to each of the two vertical signal lines 213 in a time-divisional manner (a "two-tap" system).

The vertical signal line 213 conducts the analog signals (e.g., signals A, B, C, and D as will be described in more detail below) for a particular column to a calculation and processing circuit 230, which as illustrated includes processing circuitry 231 and a plurality of counters 232. The processing circuitry 231 includes various components which will be described in more detail below, such as comparators and the like. The processing circuitry 231 receives a signal from each vertical signal line and compares the analog signal to a reference signal output from a reference signal generator 233. The reference signal generator 233 may be, for example, a digital-to-analog converter (DAC) and the reference signal may have, for example, a periodic ramp waveform. The processing circuitry 231 determines digital signals indicative of a comparison between the input analog signals from the corresponding vertical signal lines and the reference signal, performs various operations on the digital signals, and outputs a determination signal to the plurality of counters 232. In some aspects of the present disclosure, the image sensor 200 utilizes one counter 233 for each pixel column.

The calculation and processing circuit 230 may include additional components, such as latches, logic circuits, switches, S/H circuits, and the like. The calculation and processing circuit 230 may be capable of performing a method of correlated double sampling (CDS). CDS is capable of overcoming some pixel noise related issues by sampling each pixel circuit 211 twice. First, the reset voltage $V_{reset}$ of a pixel circuit 211 is sampled. This may also be referred to as the P-phase value or cds value. Subsequently, the data voltage $V_{data}$ of the pixel circuit 211 (that is, the voltage after the pixel circuit 211 has been exposed to light) is sampled. This may also be referred to as the D-phase value or light-exposed value. The reset value $V_{reset}$ is then subtracted from the data value $V_{data}$ to provide a value which reflects the amount of light falling on the pixel circuit 211. The CDS method may be performed for each path of the pixel circuit 211.

Various components of the signal processing circuit are controlled by horizontal scanning circuitry 240, also known as a "column scanning circuit" or "horizontal driving circuit." The horizontal scanning circuitry 240 causes the signal processing circuit to output signals via an output circuit 250 for further processing, storage, transmission, and the like. The vertical scanning circuitry 220, the reference circuit generator 233, and the horizontal circuitry 240 may operate under the control of a driving controller 260 and/or communication and timing circuitry 270, which may in turn operate based on a clock circuit 280. The clock circuit 280 may be a clock generator, which generates one or more clock signals for various components of the image sensor 200. Additionally or alternatively, the clock circuit 280 may be a clock converter, which converts one or more clock signals received from outside the image sensor 200 and provides the converted clock signal(s) to various components of the image sensor 200.

FIG. 3 illustrates an exemplary pixel circuit 300. The pixel circuit 300 may be an example of the pixel circuit 211 illustrated in FIG. 2. As shown in FIG. 3, the pixel circuit 300 includes a pair of photoelectric conversion devices, each of which is connected to an output of the pixel circuit 300 by two parallel paths. A first photoelectric conversion device 301a (e.g., a photodiode) is connected to a vertical signal line 310 (e.g., the vertical signal line 213 of FIG. 2) by a first path, including a first transfer transistor 302a controlled by a first transfer control signal VGA, a first storage element configured by a first storage transistor 303a and a first storage capacitor 304a, and a second transfer transistor 304a controlled by a second transfer control signal TG1; and a second path, including a third transfer transistor 302b controlled by a third transfer control signal VGB, a second storage element configured by a second storage transistor 303b and a second storage capacitor 304b, and a fourth transfer transistor 305b controlled by a fourth transfer control signal TG2. The first photoelectric conversion device 301a is connected to a first offset transistor 306a controlled by an offset control signal OFG. The first offset transistor 306a may operate as one or more of an anti-blooming transistor, a global reset transistor, and the like.

A second photoelectric conversion device 301b (e.g., a photodiode) is connected to the vertical signal line 310 by a third path, including a fifth transfer transistor 302c controlled by a fifth transfer control signal VGC, a third storage element configured by a third storage transistor 303c and a third storage capacitor 304c, and a sixth transfer transistor 304c controlled by a sixth transfer control signal TG3; and a fourth path, including a seventh transfer transistor 302d controlled by a seventh transfer control signal VGD, a fourth storage element configured by a fourth storage transistor 303d and a fourth storage capacitor 304d, and a eighth transfer transistor 305d controlled by a eighth transfer control signal TG4. The second photoelectric conversion device 301b is connected to a second offset transistor 306b controlled by the offset control signal OFG. The second offset transistor 306b may operate as one or more of an anti-blooming transistor, a global reset transistor, and the like.

A node (e.g., a floating diffusion) between the output of the first and second paths of the first photoelectric conversion device 301a and the first and second paths of the second photoelectric conversion device 301b is connected to a gate of a driving transistor 307. The node may be reset by a reset transistor 308 controlled by a reset control signal RST. A selection transistor 309 is disposed between the driving transistor 307 and the vertical signal line 310, and is controlled by a selection control signal SEL.

The various transistors are controlled to output a desired analog signal based on an amount of charge accumulated in the photoelectric conversion devices. For example, an analog signal A may be output based on charge accumulated in the first photoelectric conversion device 301a and transferred through the first path; an analog signal B may be output based on a charge accumulated in the first photoelectric conversion device 301a and transferred through the second path; an analog signal C may be output based on charge accumulated in the second photoelectric conversion device 301b and transferred through the third path; and an analog signal D may be output based on a charge accumulated in the second photoelectric conversion device 301b and transferred through the fourth path.

In operation, the components of the pixel circuit 300 are controlled in a time-divisional manner such that, during a horizontal period, incident light is converted via a photoelectric conversion device and output according to two halves of the horizontal period. The particular time division of a horizontal period used to generate an analog signal may be referred to as the phase $\phi$ of the analog signal. For example, where a horizontal period runs from 0 to t, the pixel circuit 300 may be controlled to generate an analog signal from 0 to t/2 (0 phase), from t/2 to t (180 phase), from t/4 to 3t/4 (90 phase), or from 0 to t/4 and from 3t/4 to t (270 phase).

While FIG. 3 illustrates the pixel circuit 300 having a plurality of transistors in a particular configuration, the current disclosure is not so limited and may apply to a configuration in which the pixel circuit 300 includes fewer or more transistors as well as other elements, such as additional capacitors, resistors, and the like.

I and Q Calculation in the Counter

Under the time-divisional pixel operation described above, the quantities I and Q for the pixel circuit 300 may be defined, in which the quantities I and Q are subsequently converted to a 3D description (for example, in the calculation and processing circuit 230 or in additional circuitry disposed after the output circuit 250). The quantity I may correspond to the analog signal A at 0 phase ("$A_0$") minus the analog signal B at 180 phase ("$B_{180}$"), and the quantity Q may correspond to the analog signal C at the 90 phase ("$C_{90}$") minus the analog signal D at the 270 phase ("$D_{270}$"). The quantities I and Q may be represented according to the following expressions (1a) and (1b), respectively:

$$I=q_0=G(\cos \phi+S_{BG})+O-(G(\cos(\phi+\pi))+S_{BG})+O) \tag{1a}$$

$$Q=q_{90}=G(\sin \phi+S_{BG})+O-(G(\sin(\phi+\pi))+S_{BG})+O) \tag{1b}$$

Above, G(x) represents a photoelectric conversion function of the photoelectric conversion device 301a or 301b, $S_{BG}$ represents a background level (e.g., ambient light), and O represents an offset value.

The respective values of the quantities I and Q may be calculated inside the counter, such as the counter 232 of FIG. 2, itself. Calculating the quantities I and Q in the counter may improve the output bandwidth from the counter to the host device, and may result in a device that is simpler and/or easier to fabricate (for example, by removing the need for dedicated calculation hardware). For example, the quantity I may be calculated by performing a CDS read of the $A_0$ and $B_{180}$ signals and then applying the following expression (2a), and the quantity Q may be calculated by performing a CDS read of the $C_{90}$ and $D_{270}$ signals and then applying the following expression (2b):

$$I=A_0-B_{180}=-P(i)+D(A_0)+P(ii)-D(B_{180}) \quad (2a)$$

$$Q=C_{90}-D_{270}=-P(iv)+D(C_{90})+P(iii)-D(D_{270}) \quad (2b)$$

Above, P(x) represents the p-phase (reset) value for path x (e.g., the first through fourth paths illustrated in FIG. 3) and D(x) represents a d-phase (data) value of the analog signal x. By performing the calculation in the counter, however, an additional bit may be required and it may be necessary to provide a mechanism for detecting when saturation has occurred in the pixel circuit (e.g., in the photodiode) as will be described in more detail below.

Figure 4:
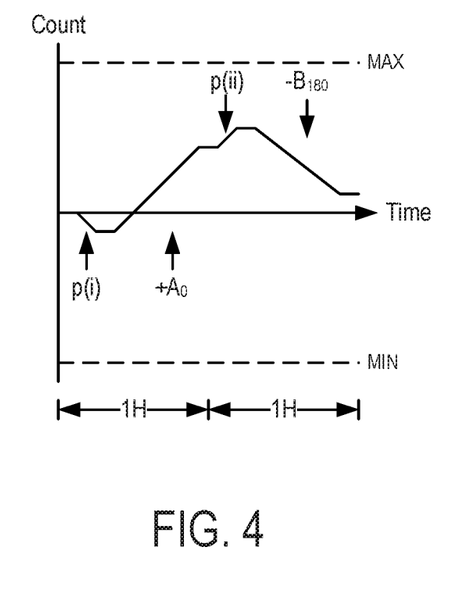
FIG. 4 illustrates an exemplary counter output according to various aspects of the present disclosure.

FIG. 4 illustrates an exemplary counter output to show how the quantities I and Q may be calculated, and the effects of saturation in the counter. During a first 1H period, the counter first begins counting down according to the p-phase value for the first path and subsequently begins counting up according to the d-phase value for the analog signal $A_0$. During a second 1H period, the counter first begins counting up according to the p-phase value for the second path and subsequently begins counting down according to the d-phase value for the analog signal $B_{180}$. The final value of the counter corresponds to the quantity I, as set forth in expression (2a) above.

Where saturation occurs, however, the counter may not be able to simply output a final count value in order to determine the quantities I and Q. In order to account for the effects of saturation, the counter may be configured to implement analog saturation detection.

Figure 5:
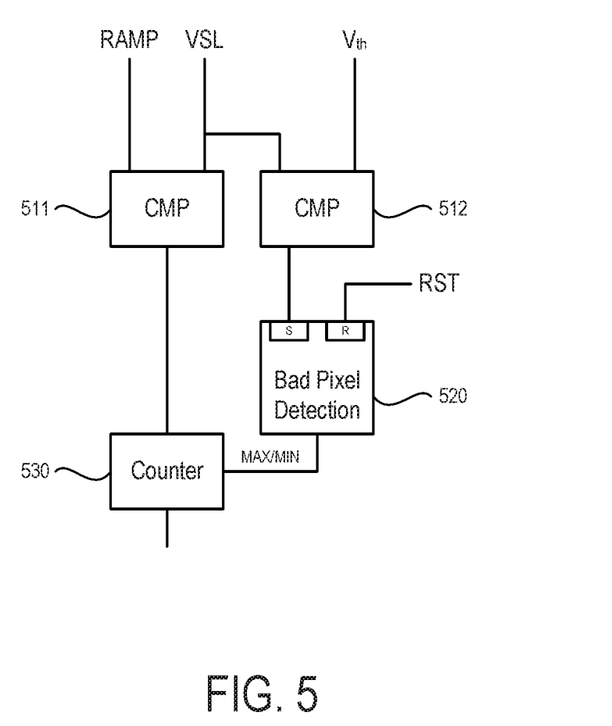
FIG. 5 illustrates an exemplary processing circuit according to various aspects of the present disclosure.

FIG. 5 illustrates circuitry which may implement analog saturation detection, and may correspond to a combination of the processing circuitry 231 and the counter 232 for a given column as illustrated in FIG. 2. The saturation detection circuitry includes a first comparator 511 configured to compare a first signal RAMP corresponding to the reference signal, such as the signal from the reference signal generator 233 of FIG. 2, to a second signal VSL on the vertical signal line, such as the vertical signal line 213 of FIG. 2; a second comparator 512 configured to compare the second signal VSL to a predetermined threshold signal Vth; a bad pixel detection circuit 520 configured to receive a comparison result from the second comparator 512 at a saturation detection input S and to receive a reset control signal RST at a reset input R; and a counter 530 configured to receive a comparison result from the first comparator 511 and to receive a saturation detection signal from the bad pixel detection circuit 520.

When the second signal VSL exceeds the threshold signal Vth, the bad pixel detection circuit 520 may be configured to set a data flag bit to a predetermined value. The data flag bit may indicate that the second signal VSL exceeded the threshold signal Vth during the first 1H period (in which case the data flag bit indicates the counter 530 should output the maximum count value instead of the value stored in the counter 530) or during the second 1H period (in which case the data flag bit indicates the counter 530 should output the minimum count value instead of the value stored in the counter 530). If no saturation has occurred, the data flag bit is not set because the value in the counter 530 is meaningful.

Figure 6:
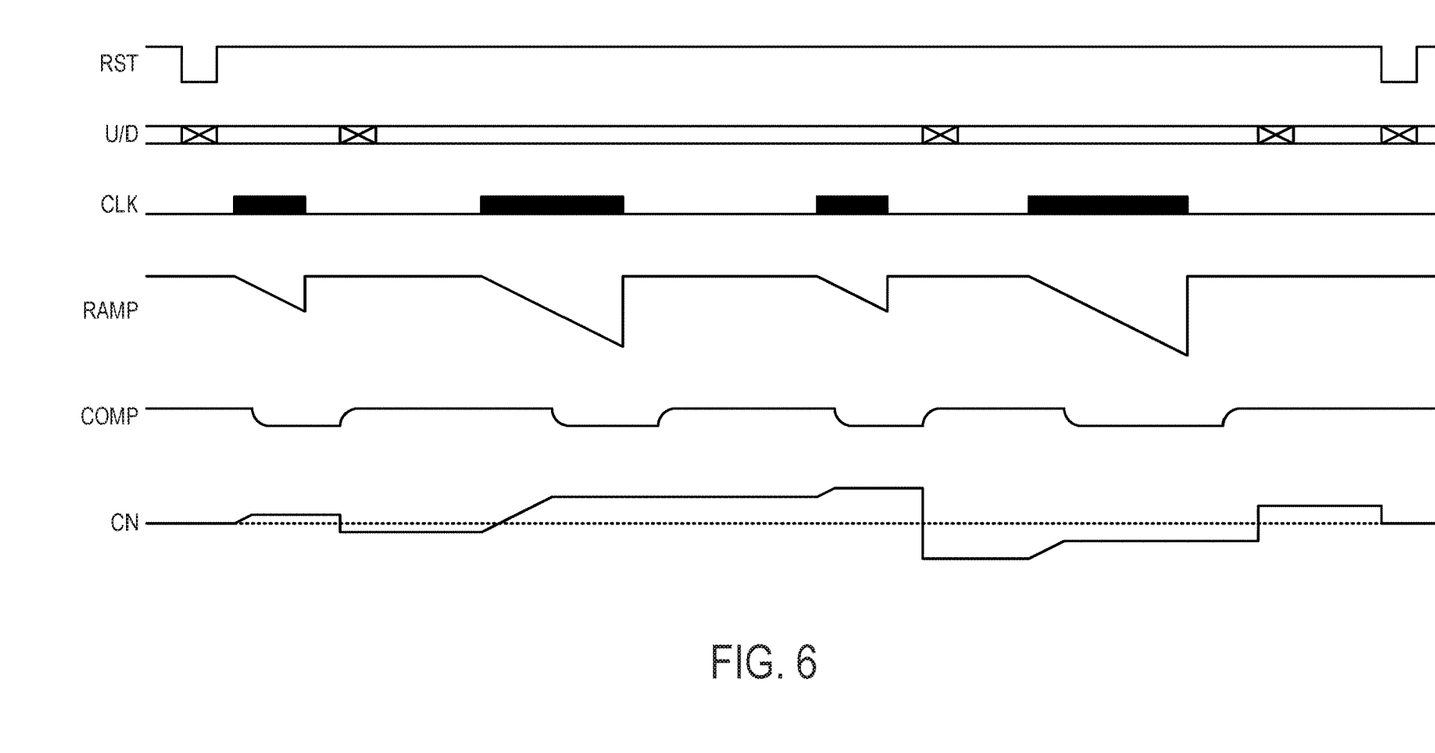
FIG. 6 illustrates exemplary operation waveforms according to various aspects of the present disclosure.

FIG. 6 illustrates an exemplary set of operation waveforms applied to the counter, such as the counter 232 of FIG. 2 and/or the counter 530 of FIG. 5. Specifically, FIG. 5 illustrates a reset signal RST, which may be used to reset/reinitialize the counter; an up/down control signal U/D, which may be used to switch the counter between an effective up-count mode and an effective down-count mode while a count value is held; a clock signal CLK, which may be provided from the communication/timing circuitry 270 and/or the clock 280 of FIG. 2; a reference signal RAMP, which may be provided from the reference signal generator 233 of FIG. 2; a comparator output COMP, which may represent the result of a comparison between the analog signal and the reference signal RAMP, and a counter output CN. The counter may be configured to count at both a rising and a falling edge of the clock signal CLK.

At the beginning of a count period, the counter output CN is reset to zero by the reset signal RST and the up/down control signal U/D. Where analog saturation detection is implemented, the reset signal RST may also be configured to reset the bad pixel detection circuit 520. The counter begins counting on each edge of the clock signal CLK until a point at which the reference signal RAMP exceeds the analog signal, at which time the comparator output COMP flips and the counter stops counting. This operation may correspond to the calculation of signal p(i) illustrated in FIG. 4. The up/down control signal U/D subsequently causes the count to switch count mode while holding the count value. This may be effected by inverting the value of each bit stored in the counter, such that data that was previously up-counted is converted into an equivalent down-count value.

Thereafter, the counter begins counting on each edge of the clock signal CLK until a point at which the reference signal RAMP again exceeds the analog signal, at which time the comparator output COMP flips and the counter stops counting. This operation may correspond to the calculation of signal $A_0$ illustrated in FIG. 4. The up/down control signal U/D again causes the count to switch count mode while holding the count value. Next, the counter begins counting a third time on each edge of the clock signal CLK until a point at which the reference signal RAMP again exceeds the analog signal, at which time the comparator output COMP flips and the counter stops counting. This may correspond to the calculation of signal p(ii) illustrated in FIG. 4. A fourth operation of the up/down control signal U/D causes the count to switch count mode while holding the count value. Finally, the counter again begins counting on each edge of the clock signal CLK until a point at which the reference signal RAMP again exceeds the analog signal, at which time the comparator output COMP flips and the counter stops counting. This operation may correspond to the calculation of signal $B_{180}$ illustrated in FIG. 4. The counter value CN is then output before the reset signal RST and the up/down control signal U/D resets the counter.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A time-of-flight sensor, comprising:
a pixel array including a plurality of pixel circuits arranged in an array, respective ones of the plurality of pixel circuits including a first photodiode configured to selectively output a first analog signal via a first path and a second analog signal via a second path, and including a second photodiode configured to selectively output a third analog signal via a third path and a fourth analog signal via a fourth path;
a signal line coupled to the first photodiode and a second photodiode; and
processing circuitry including:
a first comparator configured to compare a voltage of the signal line with a reference signal and to output a comparison result, and
a counter configured to perform a count based on the comparison result in response to a count control signal, wherein
the count control signal is configured to switch the counter between an up count mode and a down count mode while a count value is held in the counter,
the processing circuitry is configured to detect a saturation, and to output a maximum count signal or a minimum count signal in response to detecting the saturation, and
the processing circuitry includes a second comparator configured to compare the voltage of the signal line with a threshold signal and to output a saturation detection result.

2. The time-of-flight sensor according to claim 1, wherein the processing circuitry is configured to determine a first quantity and a second quantity.

3. The time-of-flight sensor according to claim 2, wherein the first quantity represents a difference between the first analog signal at a first phase and the second analog signal at a second phase, wherein the first phase is complementary to the second phase.

4. The time-of-flight sensor according to claim 3, wherein the second quantity represents a difference between the third analog signal at a third phase and the fourth analog signal at a fourth phase, wherein the third phase is complementary to the fourth phase.

5. The time-of-flight sensor according to claim 4, wherein the third phase is shifted by 90 degrees with respect to the first phase.

6. The time-of-flight sensor according to claim 2, wherein the processing circuitry is configured to determine the first quantity and the second quantity in the counter.

7. The time-of-flight sensor according to claim 1, wherein the count control signal is configured to cause the counter to invert the value of each bit stored in the counter.

8. A time-of-flight system, comprising:
a light source configured to emit a light; and
a sensor comprising:
a pixel array including a plurality of pixel circuits arranged in an array, respective ones of the plurality of pixel circuits including a first photodiode configured to selectively output a first analog signal via a first path and a second analog signal via a second path, and including a second photodiode configured to selectively output a third analog signal via a third path and a fourth analog signal via a fourth path,
a signal line coupled to the first photodiode and a second photodiode, and
processing circuitry including:
a comparator configured to compare a voltage of the signal line with a reference signal and to output a comparison result, and
a counter configured to perform a count based on the comparison result in response to a count control signal, wherein
the count control signal is configured to switch the counter between an up count mode and a down count mode while a count value is held in the counter,
the processing circuitry is configured to detect a saturation, and to output a maximum count signal or a minimum count signal in response to detecting the saturation, and
the processing circuitry includes a second comparator configured to compare the voltage of the signal line with a threshold signal and to output a saturation detection result.

9. The time-of-flight system according to claim 8, wherein the processing circuitry is configured to determine a first quantity and a second quantity.

10. The time-of-flight system according to claim 9, wherein the first quantity represents a difference between the first analog signal at a first phase and the second analog signal at a second phase, wherein the first phase is complementary to the second phase.

11. The time-of-flight system according to claim 10, wherein the second quantity represents a difference between the third analog signal at a third phase and the fourth analog signal at a fourth phase, wherein the third phase is complementary to the fourth phase.

12. The time-of-flight system according to claim 11, wherein the third phase is shifted by 90 degrees with respect to the first phase.

13. The time-of-flight system according to claim 9, wherein the processing circuitry is configured to determine the first quantity and the second quantity in the counter.

14. The time-of-flight system according to claim 8, wherein the count control signal is configured to cause the counter to invert the value of each bit stored in the counter.

15. The time-of-flight system according to claim 8, wherein a wavelength of the light is in an infrared range.

16. A system, comprising:
a first sensor configured to generate an image data, the first sensor comprising a first pixel array; and
a second sensor configured to generate a distance data, the second sensor comprising:
  a second pixel array including a plurality of pixel circuits arranged in an array, respective ones of the plurality of pixel circuits including a first photodiode configured to selectively output a first analog signal via a first path and a second analog signal via a second path, and including a second photodiode configured to selectively output a third analog signal via a third path and a fourth analog signal via a fourth path,
  a signal line coupled to the first photodiode and a second photodiode, and
  processing circuitry including:
    a comparator configured to compare a voltage of the signal line with a reference signal and to output a comparison result, and
    a counter configured to perform a count based on the comparison result in response to a count control signal, wherein
  the count control signal is configured to switch the counter between an up count mode and a down count mode while a count value is held in the counter,
  the processing circuitry is configured to detect a saturation, and to output a maximum count signal or a minimum count signal in response to detecting the saturation, and
  the processing circuitry includes a second comparator configured to compare the voltage of the signal line with a threshold signal and to output a saturation detection result.

17. The system according to claim 16, wherein the processing circuitry is configured to determine a first quantity and a second quantity, and wherein the first quantity represents a difference between the first analog signal at a first phase and the second analog signal at a second phase, wherein the first phase is complementary to the second phase.

18. The system according to claim 17, wherein the second quantity represents a difference between the third analog signal at a third phase and the fourth analog signal at a fourth phase, wherein the third phase is complementary to the fourth phase.

* * * * *